UNITED STATES PATENT OFFICE.

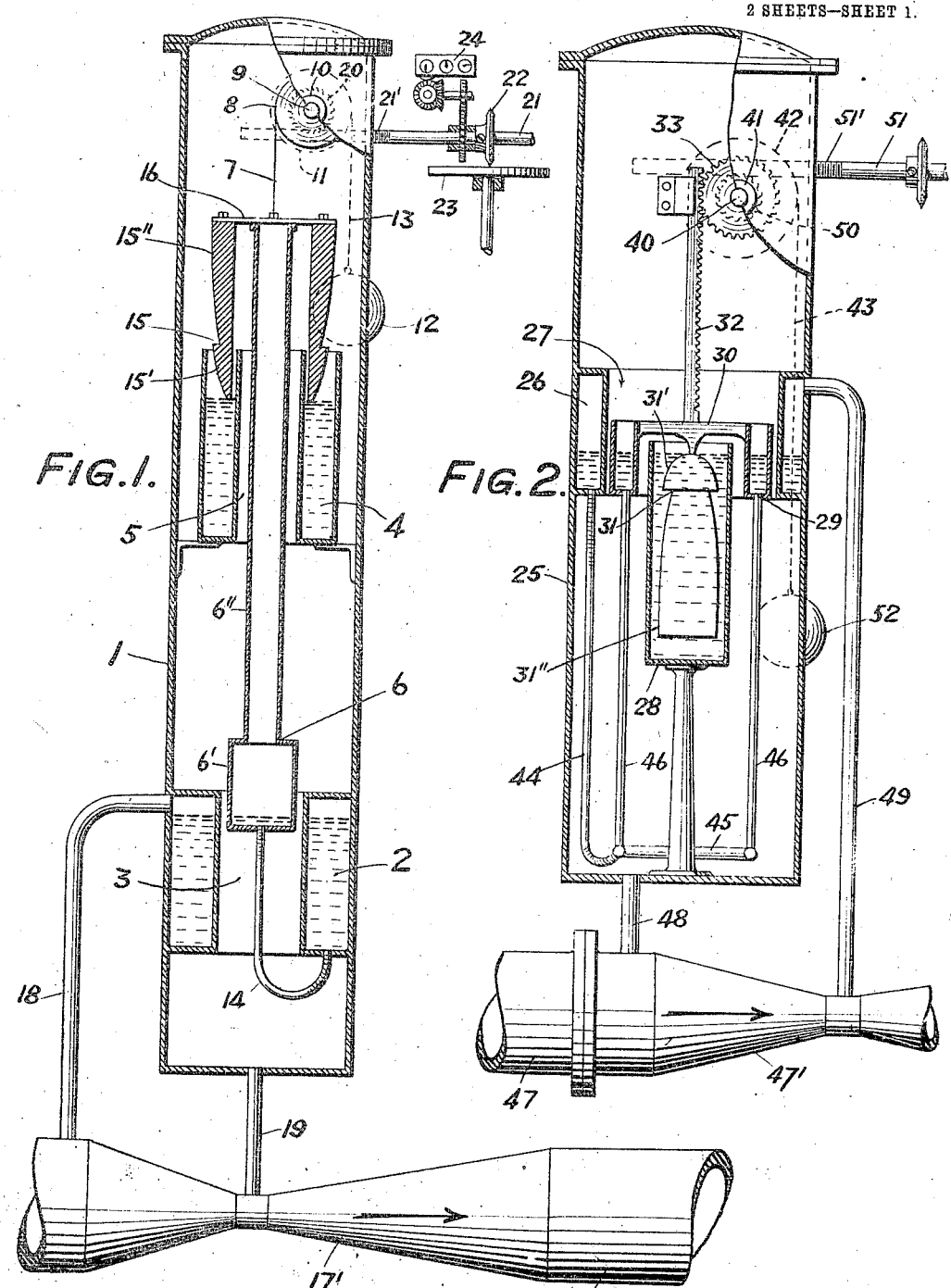

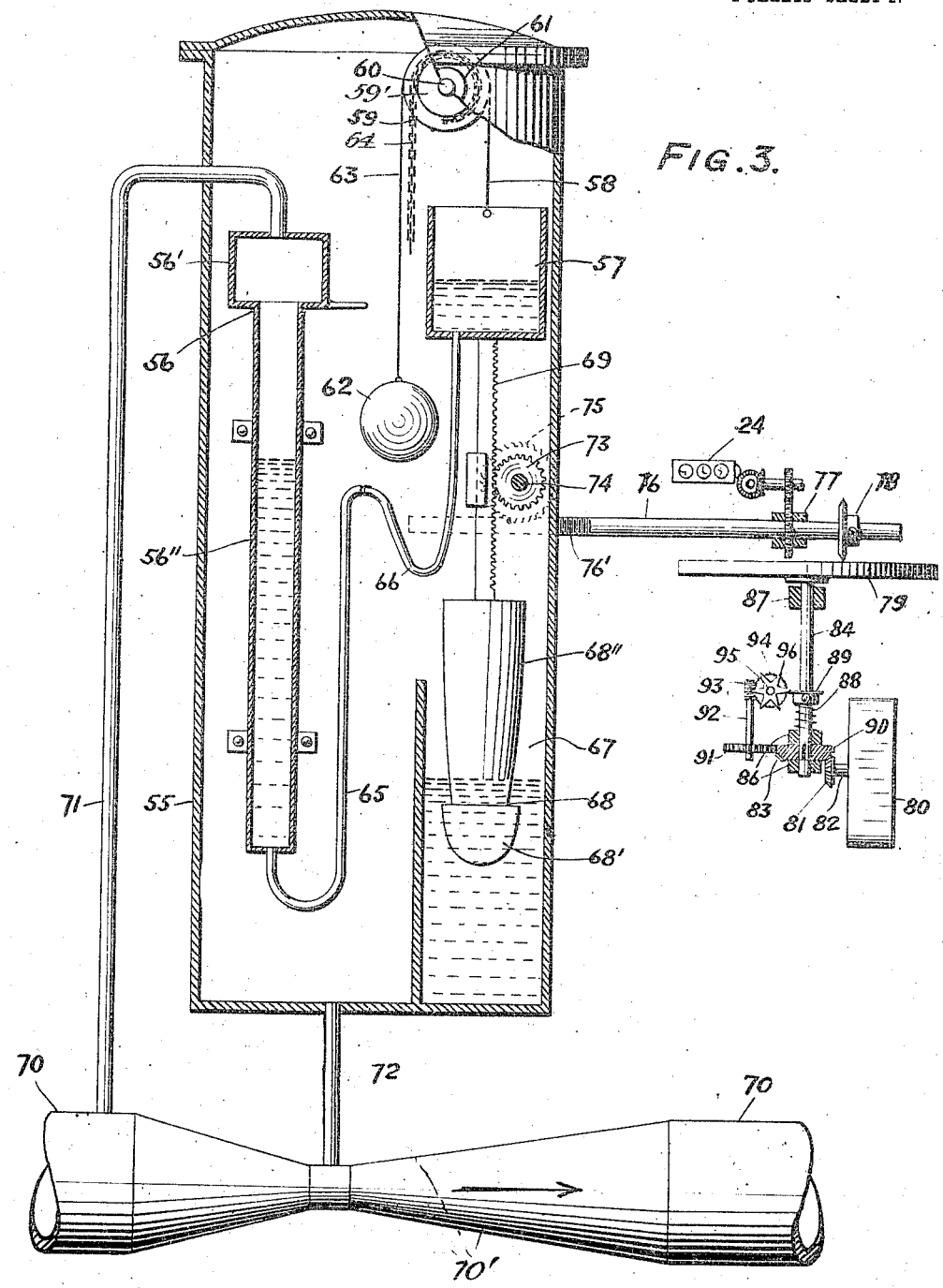

JOHN W. LEDOUX, OF SWARTHMORE, PENNSYLVANIA.

FLUID-METER.

1,038,768. Specification of Letters Patent. Patented Sept. 17, 1912.

Application filed May 21, 1910. Serial No. 562,567.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

My invention is a fluid meter in which a liquid heavier than that to be measured is displaced proportionately to changes in differential pressures resulting from the flow to be measured and an integrating mechanism is controlled so that its operation is a function of the displacement.

The leading purpose of my invention is to provide a simple apparatus having a nice degree of accuracy and capable of effecting a movement which is a simple proportion of the flow.

A further object of my invention is to provide an apparatus in which the parts to which fluid pressure is applied are so constructed and contained as to avoid leakage.

The nature of my invention will fully appear by reference to the following description and the accompanying drawings in illustration thereof.

In the drawings, Figure 1 is a sectional elevation representing apparatus embodying my improvements; Fig. 2 is a sectional elevation representing a second form of the improvements; and Fig. 3 is a sectional elevation representing a third form thereof.

The invention, as illustrated in Fig. 1 comprises a casing 1 having within the lower end thereof the closed receptacle or chamber 2 surrounding a passage 3 and above the chamber 2 an open receptacle or chamber 4 surrounding a passage 5. An open tubular receptacle 6 comprising the enlarged bottom compartment 6′ movable in the passage 3 and a contracted top compartment 6″ movable in the passage 5, is suspended by means of a tension member 7 which passes over a sheave 8 fixed on the shaft 9 within the casing, the shaft being journaled in bearings 10 in the walls of the casing. A sheave 11 is fixed to the shaft exterior to the casing and has a counterpoise 12 connected therewith by the tension member 13 to counter-balance the movable fluid pressure mechanism within the casing. A flexible tube 14 connects the bottom of the chamber 2 with the bottom of the chamber 6, whereby mercury contained in the chamber 2 may be forced into the compartment 6′ which has a comparatively large diameter to avoid the use of a tube of inconvenient length. A float 15, cored to encircle the top of the member 6 and the inner circular wall of the chamber 4, is connected by the yoke 16 to the chamber 6 and is movable thereby in the chamber 4, which contains mercury. This float being a figure of revolution, has the lower part 15′ shaped to have a displacement bearing a constant ratio to the volume of mercury in the compartment 6′ and the upper part 15″ of such character that the displacement when any part of it is submerged shall bear a constant ratio to the volume of mercury in the compartment 6″. A conduit 17, provided with a Venturi section 17′, has a normal section thereof connected by the duct 18 with the top of the chamber 2 and the throat of its Venturi section connected by the duct 19 with the bottom of the casing 1. When there is no flow in the conduit 17, liquid contained therein rises through the ducts 18 and 19 and exerts equal pressures on the surfaces of the mercury in the chambers 2 and 6, the latter having an open top. As the flow in the conduit rises from zero to the maximum, since the pressure communicated through the duct 18 grows gradually greater than the pressure communicated through the duct 19 the resultant or differential pressures will force the mercury from the chamber 2, through the duct 14, into the chamber 6. As the quantity of mercury in the chamber 6 increases, the chamber gradually descends against the resistance opposed by the float 15, which is carried downwardly in the mercury contained in the chamber 4. The float is shaped so that the volume of mercury which it displaces shall maintain a simple ratio to the rate of flow and the movement of the parts connected therewith shall be in a simple proportion to changes in the rate of flow. The movement of the reciprocating receptacle and float is communicated through the tension member 7 and sheave 8 to the shaft 9 which has thereon exterior to the casing a gear wheel 20. This wheel engages a circular track 21' on the revoluble and longitudinally movable shaft 21 having fixed thereon a traction wheel 22, movable on the constantly revolving disk 23, between its center and periphery whereby the shaft 21 operates a register 24.

In the form of the invention illustrated in Fig. 2, the casing 25 contains the closed stationary receptacle or chamber 26, with the passage 27 therethrough, the open stationary receptacle or chamber 28 having its top disposed in said passage and the movable open chamber or receptacle 29 disposed in the passage 27 and extending around the top of the chamber 28. The chamber 29 is connected by a yoke 30 with a float 31 disposed in mercury contained in the chamber 28 and with a rack 32 which engages a gear wheel 33 fixed on a shaft 40, the latter being journaled in bearings 41 in the casing. A sheave 42 is fixed to the shaft 40 exterior to the casing and is connected by a tension member 43 with a counter weight 52 for balancing the movable mechanism within the casing. The chamber 26 has its bottom connected by a flexible tube 44 with the tubular ring 45, which is connected with the bottom of the chamber 29 through the tubular uprights 46, through which means mercury in the chamber 29 is in communication with the chamber 26. The conduit 47, provided with a Venturi section 47' has a normal section connected by a duct 48 with the bottom of the casing 25 and the throat of its Venturi section connected by a duct 49 with the top of the vessel 26. When there is no flow in the conduit, the float 31 has its sections 31' and 31" submerged so that the apex of the section 31' touches the surface of the mercury, the pressures communicated through the ducts 48 and 49 are equal and the surfaces of the mercury are at the same level in the chambers 26 and 29. As the flow in the conduit rises from zero to the maximum, the gradually increasing resultant of the pressures communicated through the ducts 48 and 49, or the gradually increasing differential pressure, forces mercury gradually out of the chamber 29 and into the chamber 26, consequently the chamber 29 and the float 31 rise and the rack 32 acts through the gear 33 to revolve the shaft 40. A gear wheel 50 on the shaft 40, exterior to the casing 25, acts on a circular rack 51' of the revoluble and longitudinally movable shaft 51, which operates the registering mechanism, as previously described. The float sections 31' and 31" are so shaped that the movement of the float is a simple proportion of the changes in the rate of flow in the conduit, the section 31' having a displacement corresponding with the volume of mercury in the chamber 29 while the section 31" is shaped in correspondence with the volume of mercury in the passages 45 and 46.

In the construction shown in Fig. 3, the casing 55 has therein the stationary receptacle or chamber 56 having the lower compartment 56" of comparatively small diameter and the upper compartment 56' of larger diameter. A movable receptacle or chamber 57 is connected by a tension member 58 with a sheave 59 fixed on a shaft 60 journaled in bearings 61. A weight 62 is connected by a tension member 63 to the sheave 59 and serves as a counter-balance for the chamber 57 and the parts connected therewith. A chain 64 is wound on the sheave 59' fixed to the sheave 59. A rigid tube 65 is connected with the bottom of the chamber 56 and a flexible tube 66 connects the bottom of the chamber 57 with the top of the tube 65. A stationary compartment 67 is formed in the casing 55 and contains mercury in which is immersed, to a greater or less extent, a float 68 having the sections 68' and 68", the float being connected by a rack 69 with the bottom of the chamber 57. A conduit 70, provided with a Venturi section 70', has a normal section thereof connected by the duct 71 with the top of the chamber 56 and the throat of the Venturi section connected by the duct 72 with the bottom of the casing 55. The rack 69 engages a pinion 73 fixed on a journaled shaft within the casing. The shaft has fixed thereon, exterior to the casing, a gear wheel 75 which engages the circular rack 76' of a shaft 76 revoluble and longitudinally movable in the bearing 77. A wheel 78, fixed on the shaft 76, makes contact with a constantly rotating disk 79, the disk being revolved by a clock 80 acting through the bevel gear 81 on its shaft 82 and the bevel gear 83 on the shaft 84, which carries the disk. It will be understood that the shaft 76 operates a register 24, as previously described. In order to relieve the frictional engagement between the parts 78 and 79, at regular intervals, the shaft 84 is movable through its bearings 86 and 87 and is supported by a spring 88 which rests on the bearing 86 and acts through a collar 89 fixed on the shaft. The gear 83 has fixed thereto a gear 90 which engages a gear 91 on a revoluble shaft 92 having a worm 93 thereon, the latter acting through a worm wheel 94 on a shaft 95 which carries a star wheel or peculiarly shaped cam 96. This star wheel is revolved at a regular rate and the points thereof engage, at regular intervals, the collar 89, to give a slight downward movement to the shaft 84 against the action of the spring 88, the latter restoring the shaft at the end of the movement of depression. Thereby the disk 79 is slightly reciprocated periodically and the engagement of the wheel 78 thus relieved. When there is no flow in the conduit, the pressures communicated from the liquid therein through the ducts 71 and 72 are equal, mercury will stand at the same level in the chambers 56 and 57, the point of the float section 68' will touch the surface of the mercury in the compartment 67 and the wheel 78 will be at the center of the disk 79. As the flow in the conduit rises from zero to the maximum, the gradually increasing differential pressure forces the mercury out of the compartment 56', simultaneously with which the float section 68' becomes fully submerged, and then downwardly into the compartment 56'', with a corresponding rise of mercury in the chamber 57 and a corresponding submergence of the float section 68'', the chain 64 compensating for the tube 66 so that whatever proportion of the weight of the latter is carried by the vessel 57 a like proportion of the former will be unwound to counterbalance it. As the float moves downwardly in the mercury, the wheel 78 moves from the center toward the periphery of the disk 79, by which it is revolved. The wheel revolves the shaft 76 which actuates the registering mechanism. This float as in the previous forms has a surface or revolution of such character that its movement and that of the parts connected therewith maintain a simple ratio to the changes in the flow in the conduit.

Having described my invention, I claim:

1. In a fluid meter, a stationary receptacle, a balanced receptacle, a duct comprising a flexible member for connecting said receptacles, a liquid heavier than that to be measured for sealing communication between said receptacles, a conduit, a duct for connecting said conduit with said stationary receptacle above the level of said heavier liquid, a duct for connecting said conduit with said balanced receptacle above the level of said heavier liquid, and a liquid displacing mechanism for regulating the movement of said balanced vessel, said displacing mechanism effecting a movement which bears a constant ratio to the flow in said conduit.

2. In a fluid meter, a closed casing, a closed stationary chamber, an open stationary chamber in said casing, an open balanced chamber in said casing, a float connected with said balanced chamber and acting in said open stationary chamber, a duct having a flexible member connecting said closed stationary chamber with said balanced chamber, a conduit, a duct connecting said conduit with said casing, and a duct connecting said conduit with said closed stationary chamber.

3. In a fluid meter, a closed casing, a closed stationary chamber, an open chamber in said casing, means for balancing said open chamber, a duct comprising a flexible member connecting said chambers, and a liquid displacing mechanism for regulating the movement of said open chamber.

4. In a fluid meter, a conduit, means for differentiating the pressure of fluid flowing in said conduit, a closed stationary receptacle, means whereby pressure from fluid flowing in said conduit is communicated to said receptacle, a balanced receptacle, a duct comprising a flexible member connecting said receptacles, a liquid heavier than that to be measured for sealing the communication between said receptacles through said duct, means whereby differential pressure from fluid flowing in said conduit is communicated to said balanced receptacle, and liquid displacing mechanism for regulating the movement of said balanced receptacle, said displacing mechanism comprising an open vessel and a device adapted for displacing liquid therein so as to regulate the movement of said balanced vessel in the ratio of the changes in the rate of the flow to be measured.

5. In a fluid meter, a closed casing, a stationary closed chamber, a balanced open chamber movable in said casing, a duct comprising a flexible member for connecting said chambers, a liquid displacing mechanism comprising a float movable with said balanced chamber, a conduit, a duct connecting said conduit with said closed chamber, a duct for connecting said conduit with said casing, and an integrating mechanism regulated by the movement of said balanced chamber.

6. In a fluid meter, a closed casing, a stationary closed chamber, a balanced open chamber movable in said casing, a duct connecting said chambers, a float fixed to and movable with said balanced chamber, a chamber in which said float acts, an integrating mechanism regulated by the movement of said balanced chamber, said integrating mechanism comprising a traction wheel, means whereby said wheel is adjusted by the movement of said balanced chamber, a driving member for revolving said wheel, a journaled and longitudinally movable shaft for revolving said driving member, a clock for revolving said shaft, and means operated by said clock for intermittently moving said shaft longitudinally.

7. In a fluid meter, a stationary receptacle, a balanced receptacle, means whereby said receptacles communicate, a liquid displacing mechanism for controlling the movement of said balanced receptacle, and an integrating mechanism controlled by the movement of said balanced receptacle, said integrating mechanism comprising a constantly revolving device having a surface of revolution, a traction wheel revolved by engagement with said surface, and means for periodically withdrawing said device from said wheel.

In witness whereof I have hereunto set my name this 19th day of May, 1910, in the presence of the subscribing witnesses.

JOHN W. LEDOUX.

Witnesses:
Jos. G. Denny, Jr.,
Robt. R. Ketchel.